Nov. 23, 1954  E. C. RASSEY  2,695,141

FISHING REEL

Filed July 7, 1951

INVENTOR.
EDWARD C. RASSEY
BY Gregory S. Dolgorukof
ATTORNEY.

United States Patent Office 2,695,141
Patented Nov. 23, 1954

2,695,141

FISHING REEL

Edward C. Rassey, Detroit, Mich.

Application July 7, 1951, Serial No. 235,593

1 Claim. (Cl. 242—84.4)

This invention relates to mechanisms for winding up thread or line on a spool or reel, and to an improved fishing reel including such mechanism.

The desirability or necessity of laying the thread in neat rows as it is being wound up on a spool or reel has been well appreciated in the art, and great efforts have been exerted by those skilled in the art toward devising devices of such a nature. The most common example of application of such devices are found in sewing machines, wherein they are used for winding the thread on a bobbin, and in fishing reels for winding the line on a reel in an orderly manner i. e. without building up of the reel in places. With relatively long and thick lines winding the same in an orderly manner permits use of a smaller reel and adds greatly to the pleasure of the sport of fishing.

Conventional thread-winding devices include a thread guide positively actuated in a reciprocating manner from the spool or reel shaft with the aid of gears, cams, or similar means to give certain ratio of linear movement of the guide to the rotative speed of the shaft. In fishing reels, such a guide is made to reciprocate along a two-thread worm shaft driven from the main shaft of the reel with the aid of a gear train housed in a special gear box provided on the side of the reel. While use of such positively driven devices in sewing and similar machines is done under conditions of proper lubrication and lack of sand, and with considerations of weight not being of critical importance, their use in fishing reels presents considerable difficulties. In the first place, the weight of the reel is greatly increased. For proper operation of the reel precision manufacturing methods are required, bringing in some instances the cost of such reels to a figure as high as ten times of the cost of reels without such mechanisms. Therefore the reels with such mechanisms are within the means of only relatively small portion of sportsmen. Nevertheless, such reels present considerable difficulties in use because of the presence therein of an intricate mechanism with many parts liable to get out of order. For instance when the reel is placed on sand which is a very common occurrence, and rolls on sand in the excitement when fish is caught and has to be taken off the hook, the worm grooves become filled with sand jamming the mechanism, and wearing it out quickly. Such mechanisms do not operate properly when a thicker line than the one for which they are designed is used. Numerous other disadvantages are also found in such mechanisms and they have been well appreciated in the art.

One of the objects of the present invention is to provide an improved thread or line-winding device wherein the above disadvantages and difficulties are overcome and largely eliminated, and an inexpensive, simple but improved device is provided.

Another object of the invention is to provide an improved fishing reel with line-laying or winding mechanism, which reel is light, compact, relatively inexpensive, and yet performs its intended functions in a highly satisfactory manner.

A further object of the invention is to provide an improved fishing reel which operates equally well when used for lines of various thicknesses.

A further object of the invention is to provide an improved reel of the foregoing character, including means preventing separation of the line from its guide.

A still further object of the present invention is to provide an improved pulley or a similar device having improved means preventing separation of the belt, rope, cord, or a similar flexible connector running over such pulley.

It is an added object of the present invention to provide improved devices of the nature specified above which are simple and rugged in construction, dependable in operation, and inexpensive to manufacture.

Further objects and advantages of the invention will be apparent from the following description, taken in connection with the appended drawings, in which.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In accordance with the invention, I eliminate positive actuation of the line guide and provide a pulley freely slidable on a counter-shaft provided in the reel. The pulley is mounted in a manner to have a light clearance and therefore can tilt slightly on the shaft and thus to accommodate or align itself in a manner to follow the helix angle of the winding line. I have found that a thread or a line has a natural tendency to wind up properly if it is aligned either perpendicularly to the shaft or at a very slight angle thereto inclined toward the preceding coil. The later angle should not be large enough to bring the line or thread too far over the center line of the thread of the preceding loop which condition would cause "building-up." If the natural tendency of a line to wind properly is aided even slightly by maintaining such angle, winding is orderly. In accordance with the invention such aiding is effected with the aid of a line-guiding pulley, as mentioned. Means are provided to prevent the line or thread from getting off the pulley.

Figure 1:
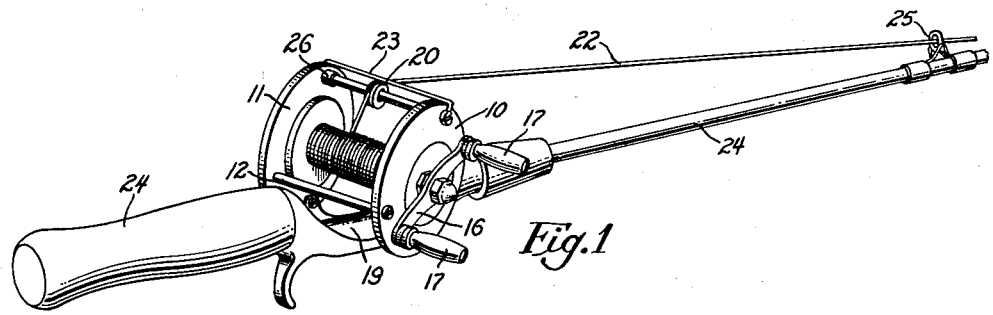
Fig. 1 is a perspective view showing my improved reel mounted in an operative position on a fishing rod.
Figure 2:
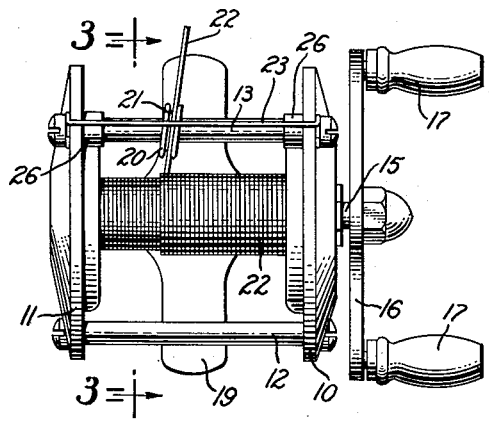
Fig. 2 is a top view of the reel of Fig. 1 shown removed from the rod.
Figure 3:
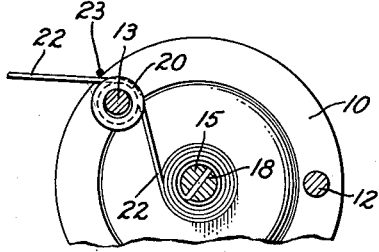
Fig. 3 is a fragmentary sectional view taken in the direction of the arrows on the section plane passing through the line 3—3 of Fig. 2.

In the drawings there is shown, by way of example an improved line-winding device embodying the present invention. Referring particularly to Figs. 1, 2 and 3 of the drawings, the reel illustrated therein comprises two end plates 10 and 11 spaced at a predetermined distance and connected together with spacing bars 12 and 13. The end plates 10 and 11 may be of any suitable size and shape, and their construction is well known in the art. Centrally of said end plates 10 and 11 there is provided a main shaft 15 extending between the end plates and mounted therein for rotation in a manner also well known in the art. Rotation of said shaft 15 is attained with the aid of a double crank 16 mounted on one end of said shaft and provided with handles 17. On the main shaft 15 there is provided a hole 18 or other suitable means for connecting one end of the fishing line to the shaft for rotation therewith. A bracket 19 secured to the end plates 10 and 11 is provided for the purpose of mounting the reel on the handle of a fishing rod, such as indicated by the numeral 24.

The construction so far described is conventional and need not be described in further detail.

In accordance with the invention, I utilize the connecting bar 13 as a stationary counter-shaft and mount thereon a line-guiding pulley 20 having a peripheral groove 21 adapted to receive a fishing line 22 when the same is passed over the pulley 20. The pulley 20 is mounted on the bar or shaft 13 with a certain clearance such as 1/64th of an inch, and therefore can rock slightly on the shaft 13. A retainer element or wire 23 coextensive with the shaft 13 is secured to the end plates 10 and 11 over the line-guiding pulley 20 as is best shown in Fig. 1 and serves to retain the line 22 in the groove and to prevent its getting off the pulley when the line becomes slack.

When the reel is mounted on the rod 24 as illustrated in Fig. 1, the counter-shaft 13 is disposed at the top of the reel, and therefore the line 22 extends upwardly over the pulley 20 and is passed therefrom through the line guides or eyelets 25 (only one of them being shown in the drawing) toward the end of the rod 24.

In operation it is desired to maintain a certain tension on the line both in winding and unwinding the same. The counter-shaft or bar 13 (as well as the bar 12) is polished and may be plated, and therefore the line-guiding pulley 20 slides freely thereon with only very light friction.

With the line 22 being passed over the pulley 20 and with the end of said line being connected or tied to the shaft 15, placing tension on the line will immediately cause the pulley 20 to move on the shaft 13 to form in top view a substantially straight line from the shaft to the eyelet 25. As the main shaft 15 is rotated, one coil is formed thereon. As the second coil begins to be laid down with the pulley 20 remaining in place, such second coil would tend to be laid on the first coil; however, because of the round cross-sectional shape of the line it would have a natural tendency to slide off and lay next to the first coil. This would displace the end of the line at the shaft to one side of the pulley, tending to form in the top view a slight angle in the line. In consequence thereof, the pulley will be shifted toward the same side. As winding continues, the pulley is moved gradually for the amount for each coil formed equal to the lead of the helix formed by the winding line. After the entire shaft is covered with the line wound thereon and the line comes to the end of the shaft and against the respective end plate, it will by necessity form a coil that would have to lie on the top of the previous coil thus starting the second row of coils, which row will be formed in exactly the same manner but in the reverse direction from the first row. At the end of the second row a coil will be formed over the last coil of the second row thereby starting the third row of coils, whereupon the process is repeated until the entire line is wound up. Spacers or sleeves 26 are provided at the ends of the shaft 13 in order to prevent the pulley 20 from going beyond the end planes of the end plates on shaft 15.

It will be understood that because of the slight clearance between the pulley 20 and the shaft 15 tension in the line permits the pulley to align itself along the line forming continuation or a tangent to the helix of the line on the shaft 15. Unwinding of the line does not present any difficulties providing tension is maintained on the line as is usually the case.

Provision of the retainer element such as wire 23 is important in order to prevent annoyance that may be caused by the line getting off the pulley.

Figure 4:
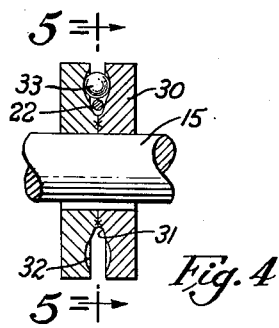
Fig. 4 is a sectional view showing a line-guiding pulley of a modified construction.
Figure 5:
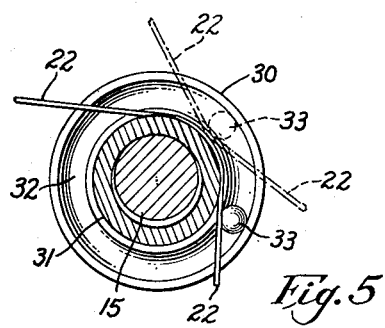
Fig. 5 is a sectional view taken in the direction of the arrows on the section plane passing through the line 5—5 of Fig. 4 but showing the ball in a different position.

Figs. 4 and 5 illustrate a modified construction of line-guiding pulley. In accordance with the invention such pulley generally designated by the numeral 30 and mounted on the shaft 15 with clearance, as illustrated and described above with reference to Fig. 3, is provided with a peripheral groove 31 adapted to receive a line 22 and having a circular ball race 32 surrounding said groove. One or more balls 33 run in said race 32. From an examination of Figs. 4 and 5 it can be easily appreciated that the line 22 is always disposed between ball 33 and the shaft 15 and cannot without being broken get off the pulley. Fig. 5 shows in full lines the relative positions of the line 22 and ball 33 for normal operation of the pulley. Should the line 22 tend to get off the pulley, which position is indicated in Fig. 5 in dotted lines, the ball 32 will occupy the position shown in said figure also in dotted lines, preventing the fishing line from getting off the pulley. By virtue of such a construction retention of the fishing line on the pulley is ensured. Such pulley may be made in two separate halves welded or otherwise secured together.

While the present invention in herein illustrated and described with reference to a fishing reel, it will be understood that it is applicable with equal success to other instances wherein winding of a thread or line in an orderly manner is required, such for instance as in a sewing machine for winding the thread on a bobbin.

The pulley illustrated in Figs. 4 and 5 and including line retaining means may be used with success in other instances. It may be used, for instance, as a machine pulley wherein preventing the flexible connector such as a belt or the like from getting off the pulley is important. Numerous instances of such applications are well known in the industry and have important safety implications.

By virtue of the above described constructions, the objects of the invention listed above and numerous other advantages are attained.

I claim:

A fishing reel mountable on a fishing rod having a line guide, said reel comprising two spaced end plates, a plurality of spacing bars connecting said plates, a main shaft extending between said plates and mounted therein for rotation, said main shaft being adapted to have one end of a fishing line connected thereto for rotation with the shaft, a guide pulley mounted on one of said spacing bars, said pulley having a peripheral groove adapted to receive and to retain therein the fishing line when the same is passed over the pulley, said pulley being mounted on its bar in such a manner that as the main shaft is rotated for winding the fishing line it tends to align itself in the plane passing through the line guide on the rod and the point at which the line contacts the reel, said pulley having a race surrounding said peripheral groove, and at least one ball running in said race with the line being arranged under said ball.

References Cited in the file of this patent

UNITED STATES PATENTS

| Number | Name | Date |
| --- | --- | --- |
| 325,813 | Briggs | Sept. 8, 1885 |
| 1,616,833 | Stremel | Feb. 5, 1927 |
| 2,249,117 | Crandall | July 15, 1941 |
| 2,421,059 | Ekins | May 27, 1947 |

FOREIGN PATENTS

| Number | Country | Date |
| --- | --- | --- |
| 103 | Great Britain | of 1880 |